United States Patent Office 3,070,533
Patented Dec. 25, 1962

3,070,533
NUCLEAR REACTOR CORE SUPPORTING MEANS
Henry Shull Arms and Paul Heinz Walter Wolff, Whetstone, and Michael Rooney, London, England, assignors to The English Electric Company Limited, London, England, a British company, and Babcock & Wilcox Limited, London, England, a British company
Filed Aug. 18, 1958, Ser. No. 755,760
Claims priority, application Great Britain Aug. 20, 1957
2 Claims. (Cl. 204—193.2)

This invention relates to gas-cooled nuclear reactors of the kind in which a heavy core structure is mounted within a pressure vessel. The invention is concerned with an improved form of support platform for supporting the core within the pressure vessel.

The support platform according to the invention comprises, in combination, a plurality of inter-connected cross members arranged to form a supporting grid which itself has insufficient rigidity to support the core structure, and an openwork assembly of strengthening members below the cross members arranged so that together the cross members and the strengthening members have sufficient rigidity to support the core structure, the nature of the openwork assembly being such as to allow comparatively free flow of cooling gas therethrough.

According to a preferred feature of the invention, the strengthening members are arranged in the form of a triangulated load-bearing framework.

According to a further preferred feature of the invention the framework comprises two inter-connected sets of triangulated trusses extending at right-angles to each other.

Figure 1:
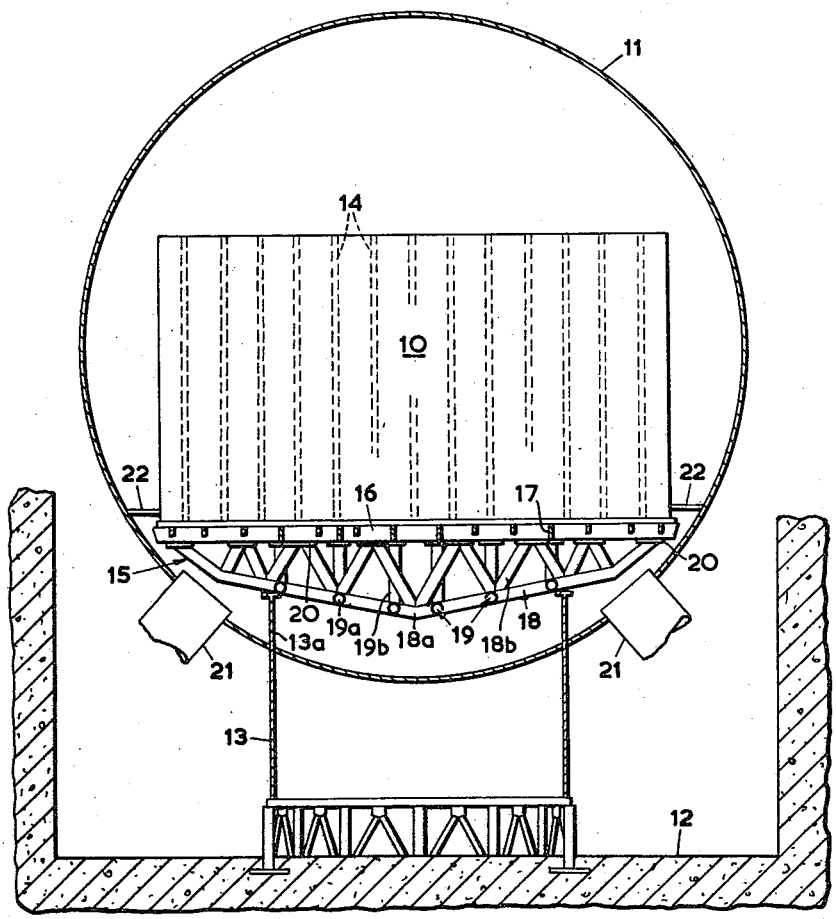
Figure 2:
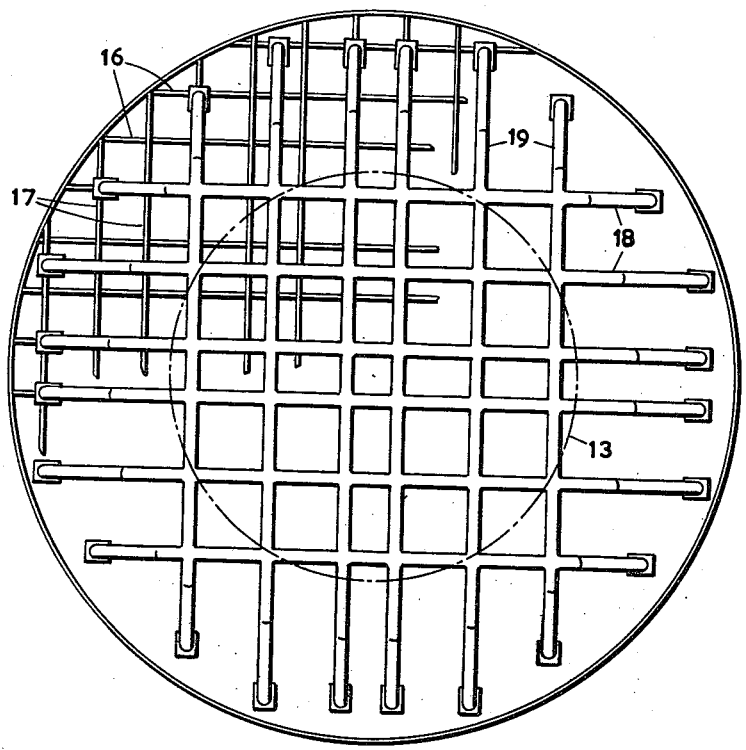

Further preferred features of the invention will appear from the following description with reference the accompanying drawings, where there is illustrated a gas-cooled nuclear reactor incorporating a preferred form of support platform according to the invention. FIG. 1 is a sectional elevation through the reactor, whilst FIG. 2 is an inverted plan view of the support platform. In both FIGURES only sufficient detail is shown for an understanding of the invention.

Referring now to the drawings, the reactor core structure 10 is contained within a spherical pressure vessel 11 which is centrally supported on foundations 12 through a cylindrical skirt 13. The core structure is provided with vertical fuel element channels, some of which are shown dotted at 14.

The core structure is mounted on a support platform which is generally indicated at 15, and which consists of a relatively shallow grid made up from inter-connected beams 16 and 17 relatively small cross section and height providing a multiplicity of gas flow passages therethrough, the beams being arranged to extend in directions at right angles to each other, and an openwork assembly of tubes arranged to form with the grid two sets of inter-connected parallel and substantially vertical inverted trusses 18 and 19 of relatively shallow height extending in the same directions as the beams 16 and 17 respectively.

Each truss 18 consists of a main span member 18a of maximum depth at its center and a number of inclined upright components 18b, the outer ends of the main span member and the upper ends of the inclined upright components being welded to loading plates 20 carried by the beams 16 and 17. The trusses 19 similarly comprise main span members 19a and inclined upright components 19b. The support platform 15 is itself centrally carried by an internal extension 13a of the cylindrical skirt 13 with clearance provided between the outer periphery of the support platform and the wall of the pressure vessel or chamber 11. The platform 15 thus comprises in effect a high-strength circular deck truss structure the relatively shallow height of which enables it to be located relatively close to the bottom of the pressure vessel and at the same time provide for free transverse and vertical gas flow through the relatively large interconnecting passageways, formed by the vertically inclined truss components 18b, 19b, to the deck grid passages.

Cooling gas is fed to the lower end of the fuel channels 14 through gas inlet ducts 21 and a gas seal 22 is provided for preventing direct passage of the cooling gas upwards between the sides of the core and the pressure vessel. The gas is exhausted from the upper part of the pressure vessel through exhaust ducts, not shown.

From the foregoing it will be appreciated that, as compared with the known form of support platform consisting solely of a relatively deep grid, the support platform hereinbefore described allows the lower face of the core to be brought lower down in the pressure vessel 11, thereby allowing a greater depth of core to be accommodated within a given size of pressure vessel. It will also be appreciated that, due to the relatively shallow depth of the grid and the relatively large sized intersecting free flow gas passages provided by the assembly of trusses, the cooling gas entering the pressure vessel 11 through the gas inlet ducts 21 will have much more ready access to the lower ends of the fuel channels.

The openwork assembly of trusses need not, of course, be made up from tubular elements. Any other form of element may be used, but in order to maintain the ready access of the cooling gas to the fuel channels, the openwork nature of the assembly should be retained.

The pressure vessel need not necessarily be spherical in shape; it may, for example, be cylindrical about a vertical axis with part-spherical ends.

What we claim as our invention and desire to secure by Letters Patent is:

1. In a nuclear reactor of the gas-cooled type including a pressure vessel of circular section and wherein at least the upper and lower portions thereof are of part-spherical shape and in which a reactor core structure extends into the lower end portion, the combination with said pressure chamber of a support platform for supporting said core structure in said lower part-spherical portion, said support platform comprising, a relatively open grid means circular in plan and constructed of a plurality of intersecting and interconnected members of relatively small cross section and height thereby forming a multiplicity of gas flow passages therebetween, said circular grid means being positioned in said pressure chamber whereby its outer periphery is spaced radially inward of said circular pressure chamber, said circular platform further including a reinforcing truss structure of relatively shallow maximum depth centered beneath said grid means, said reinforcing truss structure consisting of a plurality of parallelly spaced inverted and intersecting vertical trusses integrally interconnected together and constructed of tubular components all of which are disposed at inclinations to the vertical, said inclined tubular components of said intersecting trusses forming relatively large interconnecting passageways to provide for free horizontal and vertical gas flow therethrough to said grid passages, said tubular components of said multiplicity of trusses being individually integrally connected to said grid means thereby forming said support platform as an integral unitary unit, said plurality of intersecting trusses extending outwardly to points near the outer periphery of said grid means, said support platform increasing in depth from its radially outermost edges to a maximum depth at its center, said plurality of spaced and intersecting trusses of said reinforcing structure comprising two sets, respectively, of parallel trusses of corresponding configuration extending at right-angles to each other, a cylindrical skirt structure of a diameter smaller than the diameter of the circular platform connected to and supporting said pressure vessel, said cylindrical skirt having an extension thereon extending up into the lower end portion of said pressure vessel, said reinforcing truss structure of said circular platform being centered and wholly supported on said extension of said cylindrical skirt structure, said support platform being positioned relatively close to the lower spherical surface end portion of said pressure chamber to provide maximum height clearance for said core structure and for free gas flow circulation and passage thereof to said multiplicity of gas flow passages in said grid means.

2. The structure as defined in claim 1 wherein the integral attachment between said tubular components of said truss members and said circular grid means comprises a loading plate interposed between the end of said inclined tubular truss component and said circular grid means and integrally connected to both said component and said grid means.

References Cited in the file of this patent

UNITED STATES PATENTS

| | | |
|---|---|---|
| 1,803,070 | Pawling | Apr. 28, 1931 |
| 2,511,613 | Woolslayer et al. | June 13, 1950 |
| 2,516,739 | Woolslayer et al. | July 25, 1950 |
| 2,809,074 | McDonald | Oct. 8, 1951 |
| 2,628,818 | Graham | Feb. 17, 1953 |
| 2,946,732 | Wootton | July 26, 1960 |

OTHER REFERENCES

Proceedings of the International Conference on the Peaceful Uses of Atomic Energy, vol. III, held in Geneva Aug. 8–20, 1955, United Nations, New York 1956, p. 195.

Atomic Energy Commission Document: NAA–SR–1833, An Evaluation of the Calder Hall Type of Nuclear Power Plant, Banks et al. Jan. 18, 1957, p. 92 (Drawing #2).